United States Patent Office 3,479,193
Patented Nov. 18, 1969

3,479,193
METHOD AND SODA-LIME BATCH FOR MAKING MOLYBDENUM DISULFIDE COLORED GLASS
Clarence Edward Seeley and Charles Myron Smith, Lancaster, Ohio, assignors to Anchor Hocking Corporation, Lancaster, Ohio, a corporation of Delaware
No Drawing. Filed Mar. 11, 1965, Ser. No. 439,102
Int. Cl. C03c 3/04
U.S. Cl. 106—52          5 Claims

ABSTRACT OF THE DISCLOSURE

A method of producing bright gold to yellow colored soda-lime glasses by adding from about 0.03 to about 0.04 percent by weight of molybdenum disulfide to the glass batch as the coloring agent.

---

The present invention relates to a process of making colored glass and more particularly to a glass having controlled shading varying between a bright golden shade and a red-orange shade.

While there are certain known batches and processes for producing yellow or golden toned glass, the present invention has resulted in particularly attractive and useful shades of yellow or golden glass produced with readily available batch materials which are obtainable at minimum expense. The easily controlled process produces pre-determined shades ranging from a bright golden shade to an attractive and darker red-orange shade. The improved coloring is obtained with relatively small amounts of the coloring ingredient and the batch mixing, melting, and fining processes used with the new batch generally follow conventional procedures so that the new glass shades are obtained readily with existing equipment.

It is an object of the present invention to provide an improved method and batch for preparing a golden colored glass.

Another object of the present invention is to provide a batch and method of producing golden colored glass in which the coloring is imparted by the incorporation of relatively small amounts of molybdenum disulfide in the batch.

Another object of the present invention is to provide an improved batch and method for producing glass having a controlled range of coloring between a light gold shade and a darker red-orange shade.

Other and further objects of the invention will be obvious upon an understanding of the illustrative embodiment about to be described or will be indicated in the appended claims, and various advantages not referred to herein will occur to one skilled in the art upon employment of the invention in practice.

We have discovered that a permanent golden coloring may be imparted to glass by mixing a batch containing comparatively small amounts of molybdenum disulfide and that by varying the amounts of molybdenum disulfide and by adjusting the proportions of certain other ingredients as indicated below, a controlled series of shadings between a light or bright golden color and including golden yellow shades and yellow shades and red-orange shades may be produced.

As indicated, the shadings of the glass produced by the present method will vary depending upon the percentage of the coloring agent or molybdenum disulfide used in the batch as well as certain other conditions discussed below. It is thus clear that our invention is not restricted to the production of a precise shade but covers a range of colors as described above by the use of the batch ingredients as indicated and under the conditions described.

The following examples illustrate the production of the colored glass:

EXAMPLE I

A glass batch is mixed containing the following constituents:

| Batch constituents: | Weight in pounds |
|---|---|
| Sand | 2000 |
| Soda ash | 696 |
| B. D. lime | 312 |
| Fluorspar | 23 |
| Barytes | 11 |
| Saltcake | 6 |
| Nepheline syenite | 107 |
| Molybedenum disulfide | 1 |
| Sea coal | 4 |

The batch composition percent by weight as calculated for the above batch is as follows:

| | |
|---|---|
| $SiO_2$ | 72.42 |
| $Fe_2O_3$ | .024 |
| $Al_2O_3$ | 1.07 |
| CaO | 6.82 |
| MgO | 4.41 |
| BaO | .24 |
| $Na_2O$ | 14.78 |
| $K_2O$ | .19 |
| $MoS_2$ | .035 |

The above listed constituents are thoroughly mixed to form a glass batch and the batch is then charged into a glass tank and is heated or fused in the known manner to the complete fusion point of the mixture. After the fusing or melting of the batch, it is subjected to the usual fining treatment for the removal of bubbles and the fined melt is then ready for use in the conventional forming operations to manufacture colored glass articles, such as tableware or other glass articles adaptable to and desirable in the golden colorings resulting from the process of the invention. A bright golden glass results.

The melting furnace preferably should have a soft low-oxygen content fire and the amount of sea coal used as a reducing agent should be kept in the range of 5 to 6 pounds per a 2,000 pound sand basis.

EXAMPLE II

A similar glass having a differing shade with a more yellow appearance or a golden-yellow shade is produced by substituting 20 pounds of saltcake in place of 6 pounds used in Example I and by using 18 oz. of molybdenum disulfide in place of the 16 oz. specified in Example I and also by increasing the sea coal contents to about 5½ pounds with all the other constituents remaining the same. Using the same conventional melting and fining process, a uniformly colored melt results with a golden-yellow color and with the darker shading characteristics resulting from the above indicated increase in the three ingredients as indicated.

EXAMPLE III

An additional batch formulation providing a shade with a clear yellow appearance and differing appreciably as regards its shading from the glass produced by Examples I and II results from a batch mixture similar to that of Example I but having 25 pounds of saltcake and 5 pounds of sea coal. When subjected to the regular melting and fining process this batch mixture results in an attractive yellow colored glass.

EXAMPLE IV

Where a darker shade is desired it may be obtained by using the list of constituents of Example I with the same proportions of all ingredients with the exception of the substitution of 26 oz. of molybdenum disulfide and 6 pounds of sea coal. After the melting and fining process a red-orange shade results.

It will be seen that the above described coloring effects are obtained in accordance with the method of the invention with the use of relatively small amounts of the coloring ingredient molybdenum disulfide.

Definite adjustments in certain of the ingredients and particularly in the amount of molybdenum disulfide, saltcake, and sea coal as indicated give predetermined changes in the shadings obtained. These adjustments are made in the original batch constituents and the melting and fining operations are the same for each of the shades and follow generally conventional melting and fining practices using the preferred soft low oxygen fires as indicated above.

A coloring process has been provided using soda lime glass constituents with the addition of certain coloring agents and the following table indicates the general ranges useful in the batch for providing the shades of colored glass as described.

General percentage range of batch constituents:

| | |
|---|---|
| $SiO_2$ | 70% to 73% |
| $Fe_2O_3$ | 0 to 0.10 |
| $Al_2O_3$ | .8 to 1.5 |
| CaO | 6.0 to 12.0 |
| MgO | .50 to 5.0 |
| BaO | 0 to .25 |
| $Na_2O$ | 14 to 16 |
| $K_2O$ | 0 to 1.0 |
| $MoS_2$ | .03 to .06 |

The present process has been tested by melting and fining batches of materials in the general proportions indicated above to produce the colored glass. The batches ase easily melted and fined with conventional glass melting, fining, and forming equipment to produce uniform colors with the shade controlled by adjustments in the portions of constituents as indicated. Such conventional melting, fining, and forming conditions are well-known in the art and described for example in Tooley's "Handbook of Glass Manufacture," Ogden Publishing Company, New York, N.Y., 1953 edition.

It will be seen that a new method and batch have been described for producing attractive shades of golden or yellow glass with a range of colors from bright gold to a darker red-orange shade. These shades are formed using a relatively inexpensive coloring as described and with a uniform coloring resulting. The process as described may be performed with conventional melting, fining, and forming equipment.

Having thus described our invention, we claim:

1. The method of producing permanently colored glass ranging in color from bright gold to yellow comprising the steps of providing a glass batch consisting essentially of the following constituents in calculated percentages by weight: 70 to 73 $SiO_2$, 0 to 0.10 $Fe_2O_3$, 8 to 1.5 $Al_2O_3$, 6.0 to 12.0 CaO, .50 to 5.0 MgO, 0 to .25 BaO, 14 to 16 $Na_2O$, 0 to 1.0 $K_2O$, and from .03 to .04 $MoS_2$, and melting and fining said batch constituents to provide a colored molten glass for glass article forming.

2. The method of producing permanently colored glass ranging in color from a bright gold to yellow comprising the steps of providing a glass batch consisting essentially of the following constituents in calculated percentages by weight: 70 to 73 $SiO_2$, 0 to 0.10 $Fe_2O_3$, .8 to 1.5 $Al_2O_3$, 6.0 to 12.0 CaO, .50 to 5.0 MgO, 0 to .25 BaO, 14 to 16 $Na_2O$, 0 to 1.0 $K_2O$, and from .03 to .04 $MoS_2$, and melting the batch with low oxygen content fires and fining said batch constituents to provide a colored molten glass for glass article forming.

3. A glass batch for producing colored glass ranging in color from bright gold to yellow consisting essentially of the following constituents in calculated percentages by weight: 70 to 73 $SiO_2$, 0 to 0.10 $Fe_2O_3$, .8 to 1.5 $Al_2O_3$, 6.0 to 12.0 CaO, .50 to 5.0 MgO, 0 to .25 BaO, 14 to 16 $Na_2O$, 0 to 1.0 $K_2O$, and from .03 to .04 $MoS_2$.

4. The method of producing permanently colored soda-lime glass ranging in color from bright gold to yellow comprising the steps of mixing ingredients consisting essentially of suitable amounts of sand, soda ash, lime, fluorspar, barytes, saltcake, nepheline syenite, and sea coal and adding a coloring agent thereto consisting of from about 0.03 to about 0.04 percent by weight of molybdenum disulfide and melting and fining the mixture.

5. A glass batch for producing permanently colored glass ranging in color from bright gold to yellow consisting essentially of soda-lime glass forming constituents, and a color imparting agent comprising molybdenum disulfide in the amount of about 0.03 to about 0.04 percent of the batch by weight.

References Cited
UNITED STATES PATENTS 3,345,190  10/1967  Albinak et al. _____ 106—47

HELEN M. McCARTHY, Primary Examiner

W. R. SATTERFIELD, Assistant Examiner

U.S. Cl. X.R.

106—47

PO-1050
(5/69)

UNITED STATES PATENT OFFICE
CERTIFICATE OF CORRECTION

Patent No. 3,479,193　　　　　　　　Dated November 18, 1969

Inventor(s) Clarence Edward Seeley et al

It is certified that error appears in the above-identified patent and that said Letters Patent are hereby corrected as shown below:

In References Cited, in column 6, line 45, the following additional references should be listed under the Albinak patent:

```
---3,003,886     10/1961     Pither -----106/47
   3,326,702      6/1967     Babcock-----106/52
```

PUBLICATIONS

Weyl, W.A., Colored Glasses, London, Dawson's, 1959, p. 279.--

SIGNED AND
SEALED
JUN 2 1970

(SEAL)
Attest:

Edward M. Fletcher, Jr.
Attesting Officer

WILLIAM E. SCHUYLER, JR.
Commissioner of Patents